US012276232B1

(12) United States Patent
Yatabe

(10) Patent No.: US 12,276,232 B1
(45) Date of Patent: Apr. 15, 2025

(54) CONTROL SYSTEM FOR VEHICLE

(71) Applicant: TOYOTA JIDOSHA KABUSHIKI KAISHA, Toyota (JP)

(72) Inventor: Takahiro Yatabe, Hiratsuka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/743,116

(22) Filed: Jun. 14, 2024

(30) Foreign Application Priority Data

Oct. 13, 2023 (JP) ................................ 2023-177271

(51) Int. Cl.
*F02D 41/00* (2006.01)

(52) U.S. Cl.
CPC ..... *F02D 41/0007* (2013.01); *F02D 41/0055* (2013.01); *F02D 2041/001* (2013.01)

(58) Field of Classification Search
CPC ............ F02D 41/0007; F02D 41/0055; F02D 2041/001
See application file for complete search history.

(56) References Cited

U.S. PATENT DOCUMENTS 10,352,280 B2 * 7/2019 Yaguchi ................ F01M 13/00

FOREIGN PATENT DOCUMENTS

| | | | | |
|---|---|---|---|---|
| CN | 107923348 A * | 4/2018 | | F01M 13/022 |
| CN | 106121772 B * | 1/2020 | | F01M 13/00 |
| CN | 112983641 A * | 6/2021 | | F01M 13/00 |
| DE | 102015111793 A1 * | 2/2016 | | F02B 31/08 |
| DE | 102017130017 A1 * | 6/2018 | | B60W 20/00 |
| JP | S57-013814 U | 1/1982 | | |
| JP | 2006-046244 A | 2/2006 | | |
| JP | 2008-111422 A | 5/2008 | | |
| JP | 2014231760 A * | 12/2014 | | |
| WO | 2008/041113 A2 | 4/2008 | | |

OTHER PUBLICATIONS

Machine Translation of JP2014231760A PDF File Name: "JP2014231760A_Machine_Translation.pdf" (Year: 2014).*
Machine Translation of CN112983641A PDF File Name: "CN112983641A_Machine_Translation.pdf" (Year: 2021).*
Machine Translation of CN107923348A PDF File Name: "CN107923348A_Machine_Translation.pdf" (Year: 2018).*
Machine Translation of DE102015111793A1 PDF File Name: "DE102015111793A1_Machine_Translation.pdf" (Year: 2016).*
Machine Translation of CN106121772B PDF File Name: "CN106121772B_Machine_Translation.pdf" (Year: 2020).*
Machine Translation of DE102017130017A1 PDF File Name: "DE102017130017A1_Machine_Translation.pdf" (Year: 2018).*

* cited by examiner

*Primary Examiner* — Grant Moubry
*Assistant Examiner* — Ruben Picon-Feliciano
(74) *Attorney, Agent, or Firm* — SoraIP, Inc.

(57) ABSTRACT

During NA operation, the electronic control unit, which is a control device of the vehicle equipped with the turbocharged engine equipped with the blow-by gas recirculation device that ventilates the crankcase by extrusion of the blow-by gas by the supercharging pressure during the supercharging operation, executes the stagnation elimination control for changing the operating condition of the turbocharged engine to the operating condition in which the driving force of the vehicle is maintained and the stagnation state of the ventilation is eliminated, when the stagnation state in which the intake pipe pressure of the turbocharged engine is in the vicinity of the atmospheric pressure continues.

6 Claims, 5 Drawing Sheets

CONTROL SYSTEM FOR VEHICLE

CROSS-REFERENCE TO RELATED APPLICATION

This application claims priority to Japanese Patent Application No. 2023-177271 filed on Oct. 13, 2023, incorporated herein by reference in its entirety.

BACKGROUND

1. Technical Field

The present disclosure relates to a control device for a vehicle including a turbocharged engine.

2. Description of Related Art

As a device applied to an engine mounted on a vehicle, there is a blow-by gas venting device that vents blow-by gas in a crankcase. As the blow-by gas venting device, there is a device that performs venting by sucking blow-by gas into intake air by an intake negative pressure generated by throttling of a throttle valve. In a case of a turbocharged engine, the intake negative pressure is not generated during a turbocharging operation. Therefore, the venting of blow-by gas using the intake negative pressure as described above cannot be performed. Japanese Unexamined Patent Application Publication No. 2006-46244 (JP 2006-46244 A) describes a blow-by gas venting device that performs venting by pushing out blow-by gas in a crankcase by a turbocharging pressure.

SUMMARY

When the venting by the intake negative pressure and the venting by the turbocharging pressure are used in combination, the blow-by gas can be vented during both the natural intake operation and the turbocharging operation of the turbocharged engine. Even in such a case, however, neither the venting by the intake negative pressure nor the venting by the turbocharging pressure can effectively be performed when the intake pipe pressure is in the vicinity of the atmospheric pressure. Therefore, the ventilation of the crankcase is insufficient when the intake pipe pressure remains in the vicinity of the atmospheric pressure.

A control device for a vehicle that solves the above problem is a device configured to control a vehicle including a turbocharged engine.

The turbocharged engine includes a compressor installed in an intake passage, a throttle valve installed in a portion of the intake passage downstream of the compressor, and a blow-by gas recirculation device configured to recirculate blow-by gas in a crankcase into intake air.

The blow-by gas recirculation device includes a first passage that communicates a portion of the intake passage downstream of the throttle valve with the crankcase, a second passage that communicates a portion of the intake passage downstream of the compressor and upstream of the throttle valve with the crankcase, and a third passage that communicates a portion of the intake passage upstream of the compressor with the crankcase.

The control device is configured to, when a ventilation stagnation state of the turbocharged engine continues, execute stagnation termination control for changing an operation condition of the turbocharged engine to an operation condition in which a driving force of the vehicle is maintained and the ventilation stagnation state is terminated. The ventilation stagnation state is a state in which an intake pipe pressure of the turbocharged engine is in a vicinity of an atmospheric pressure.

The control device for the vehicle has an effect of suppressing the failure in the ventilation of the crankcase of the turbocharged engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a control device for a vehicle will be described in detail with reference to FIGS. 1 to 6.

Configuration of Turbocharged Engine

Figure 1:
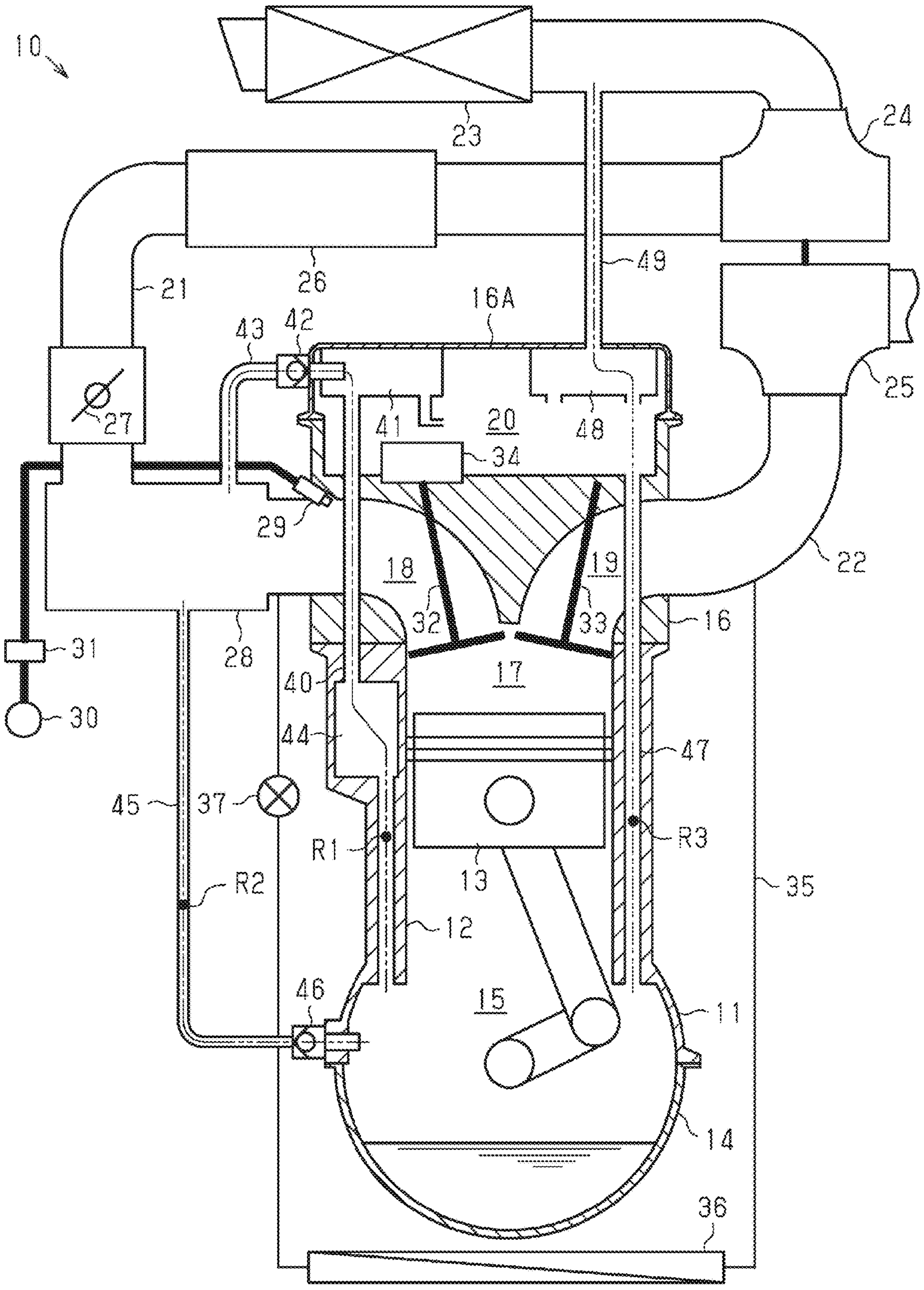
FIG. 1 is a diagram schematically illustrating a configuration of a turbocharged engine mounted on a vehicle to which an embodiment of a control device for a vehicle is applied.

First, with reference to FIG. 1, a configuration of a turbocharged engine 10 mounted on a vehicle to which the present embodiment is controlled will be described. The turbocharged engine 10 shown in FIG. 1 is a hydrogen engine using hydrogen as a fuel. In the hydrogen engine, combustible hydrogen may be contained in the blow-by gas. Therefore, a hydrogen engine is required to have a higher blow-by gas ventilation performance than that of a gasoline engine or a diesel engine.

The turbocharged engine 10 includes a cylinder block 11. A plurality of cylinders 12 are formed inside the cylinder block 11. In FIG. 1, only one of the plurality of cylinders 12 is shown. Each cylinder 12, the piston 13 is reciprocally accommodated. A combustion chamber 17 for burning hydrogen is formed in a portion of the cylinder 12 above the piston 13. An oil pan 14 for storing oil is attached to a lower portion of the cylinder block 11. A crankcase 15 is formed in a portion of the inside of the cylinder block 11 below the cylinder 12. A cylinder head 16 is attached to an upper portion of the cylinder block 11. Inside the cylinder head 16, individual intake ports 18 and exhaust ports 19 are formed for each cylinder 12. A head cover 16A is attached to the upper side of the cylinder head 16. A valve train chamber 20 for accommodating a valve actuation mechanism is formed inside an upper portion of the cylinder head 16 covered with the head cover 16A.

The turbocharged engine 10 includes an intake passage 21, which is a passage for introducing air into the combustion chamber 17, and an exhaust passage 22, which is a passage for discharging exhaust gas from the combustion chamber 17. An air cleaner 23 for filtering dust and the like in the air is provided in the intake passage 21. A compressor 24 is installed in a portion of the intake passage 21 downstream of the air cleaner 23. The compressor 24 constitutes a turbocharger together with a turbine 25 installed in the exhaust passage 22. An intercooler 26 is installed in a portion of the intake passage 21 downstream of the compressor 24. The intercooler 26 is a heat exchanger for cooling air that has become hot due to compression in the compressor 24. A throttle valve 27 is installed in a portion of the intake passage 21 downstream of the intercooler 26. The throttle valve 27 is a valve for regulating a flow rate of air sent to the combustion chamber 17 through the intake passage 21. The intake passage 21 is branched separately from the cylinder 12 in an intake manifold 28 provided at a portion downstream of the throttle valve 27. The intake manifold 28 is connected to the combustion chamber 17 through an intake port 18.

Further, the turbocharged engine 10 includes an injector 29, a hydrogen tank 30, and a pressure regulating device 31. The pressure regulating device 31 regulates the pressure of the hydrogen in the hydrogen tank 30 and supplies it to the injector 29. The injector 29 injects hydrogen into the air subjected to combustion in the combustion chamber 17. In the case of FIG. 1, the injector 29 is installed so as to inject hydrogen into the intake port 18, but the injector 29 may be installed so as to inject hydrogen into the combustion chamber 17.

The turbocharged engine 10 includes an intake valve 32 that opens and closes the intake port 18 with respect to the combustion chamber 17, and an exhaust valve 33 that opens and closes the exhaust port 19 with respect to the combustion chamber 17. The turbocharged engine 10 includes a variable valve mechanism 34 that makes the valve timing of the intake valve 32 variable.

The turbocharged engine 10 includes an exhaust gas recirculation device that recirculates a part of the exhaust gas into the intake air. The exhaust gas recirculation device comprises a Exhaust Gas Recirculation (EGR) passage 35, an EGR cooler 36 and a EGR valve 37. EGR passage 35 is a passage that communicates the intake passage 21 with the exhaust passage 22. EGR cooler 36 is a heat-exchanger that cools the exhaust gas recirculated into the intake air through EGR passage 35. EGR valve 37 is a valve for adjusting the recirculation rate of the exhausted air. The recirculation rate of exhaust represents the flow rate of exhaust recirculated through EGR passage 35 into the intake air.

Configuration of Blow-by Gas Recirculation Device

The turbocharged engine 10 further includes a blow-by gas recirculation device. The blow-by gas recirculation device is a device that ventilates the crankcase 15 by recirculating the blow-by gas in the crankcase 15 into the intake air. The blow-by gas recirculation device includes three passages, a first passage R1, a second passage R2, and a third passage R3, as passages that communicate the crankcase 15 and the intake passage 21.

The first passage R1 is a passage that communicates a part of the intake passage 21 downstream of the throttle valve 27 with the crankcase 15. The first passage R1 includes a blow-by gas passage 40, a head-side separator 41, a first check valve 42, a first PCV hose 43, and a block-side separator 44. The head-side separator 41 and the block-side separator 44 are separators that separate oil mist in the blow-by gas flowing through the first passage R1. The head-side separator 41 is attached to the inside of the head cover 16A. The blow-by gas passage 40 is a passage that connects the crankcase 15 and the head-side separator 41 through the inside of the cylinder block 11 and the cylinder head 16. The block-side separator 44 is provided at an intermediate portion of the blow-by gas passage 40 in the cylinder block 11. The first PCV hose 43 is a hose connecting the head-side separator 41 and the intake manifold 28. The first check valve 42 is a valve that allows the flow of gas from the inside of the crankcase 15 to the intake passage 21 through the first passage R1, while restricting the flow of gas from the intake passage 21 to the inside of the crankcase 15 through the first passage R1. The first check valve 42 is installed at a connecting portion of the first PCV hose 43 to the head-side separator 41. In the present embodiment, the head-side separator 41 and the block-side separator 44 correspond to the first separator that separates the oil mist in the gases flowing through the first passage R1.

The second passage R2 is a passage that communicates a part of the intake passage 21 downstream of the compressor 24 with the crankcase 15. In FIG. 1, the second passage R2 is configured to communicate the intake manifold 28 with the crankcase 15. The second passage R2 includes a second PCV hose 45 and a second check valve 46. The second PCV hose 45 is a hose that connects the crankcase 15 and the intake manifold 28. The second check valve 46 is a valve that allows the flow of gas from the intake passage 21 through the second passage R2 to the inside of the crankcase 15, while restricting the flow of gas from the inside of the crankcase 15 through the second passage R2 to the intake passage 21. The second check valve 46 is installed at a connecting portion of the second PCV hose 45 to the crankcase 15.

The third passage R3 is a passage that communicates a part of the intake passage 21 upstream of the compressor 24 with the crankcase 15. The third passage R3 includes an oil return passage 47, a valve train chamber 20, a second separator 48, and a third PCV hose 49. The oil return passage 47 is a passage that passes through the inside of the cylinder block 11 and the cylinder head 16 and communicates the valve train chamber 20 with the crankcase 15. The oil return passage 47 functions as a passage for recirculating oil from the valve train chamber 20 to the oil pan 14, and also functions as a passage for circulating gas between the valve train chamber 20 and the crankcase 15. The second separator 48 is a separator that separates the oil mist in the blow-by gas flowing through the third passage R3. The second separator 48 is disposed inside the head cover 16A. The third PCV hose 49 is a hose that connects a part of the intake passage 21 downstream of the air cleaner 23 and upstream of the compressor 24 to the second separator 48.

Ventilation of Crankcase

Next, the ventilation operation of the crankcase 15 by the blow-by gas recirculation device will be described with reference to FIGS. 2 to 4. The open arrows shown in FIGS. 2 and 3 indicate the direction of air flow in the blow-by gas recirculation device. Also, the hatched arrows shown in FIGS. 2 and 3 indicate the flow direction of the blow-by gas in the blow-by gas recirculation device. In the following explanation, the pressure of the intake air in the intake manifold 28 of the turbocharged engine 10 is referred to as an intake pipe pressure PM. In the following explanation, the operation of the turbocharged engine 10 in a state in which the intake pipe pressure PM is at a negative pressure, that is, in a state lower than the atmospheric pressure is referred to as Natural Aspiration (NA) operation. Further, the operation of the turbocharged engine 10 in a state in which the intake pipe pressure PM is positive, that is, in a state in which the intake pipe pressure is higher than the atmospheric pressure, is referred to as a supercharging operation.

Figure 2:
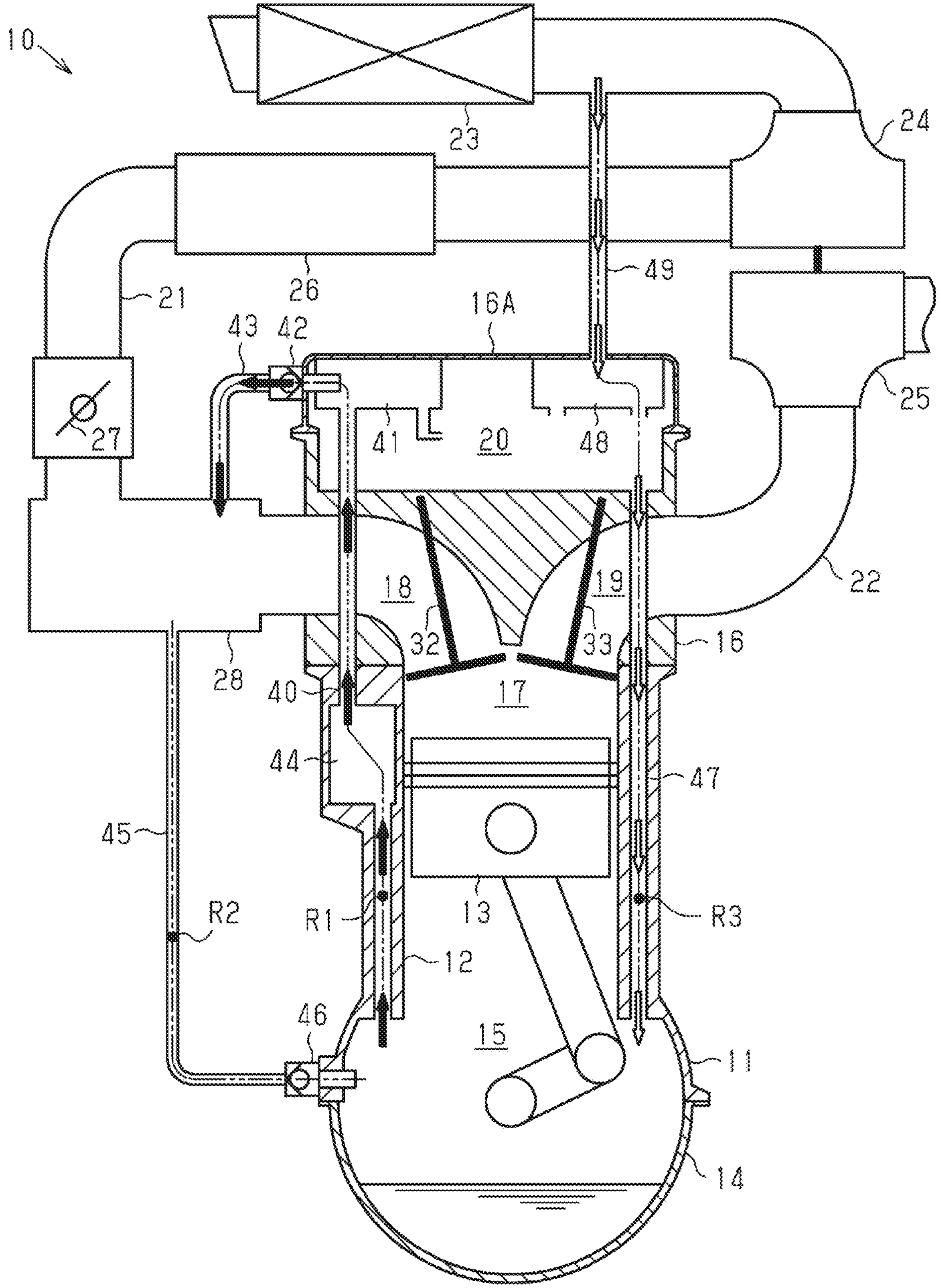
FIG. 2 is a view showing a flow of gas during natural intake operation in the blow-by gas recirculation device installed in the turbocharged engine.

FIG. 2 shows the condition of the blow-by gas recirculation device during NA operation. During NA operation, the inside of the intake manifold 28 becomes a negative pressure. The inside of the crankcase 15 is connected to the intake manifold 28 through the first passage R1. Further, the first check valve 42 installed in the first passage R1 is configured to allow the flow of gases from the inside of the crankcase 15 toward the intake passage 21 through the first passage R1. On the other hand, the inside of the crankcase 15 is connected to a part of the intake passage 21 upstream of the compressor 24 through the third passage R3. Therefore, at this time, air is introduced into the crankcase 15 through the third passage R3, and the blow-by gas in the crankcase 15 is sucked into the intake manifold 28 through the first passage R1.

Figure 3:
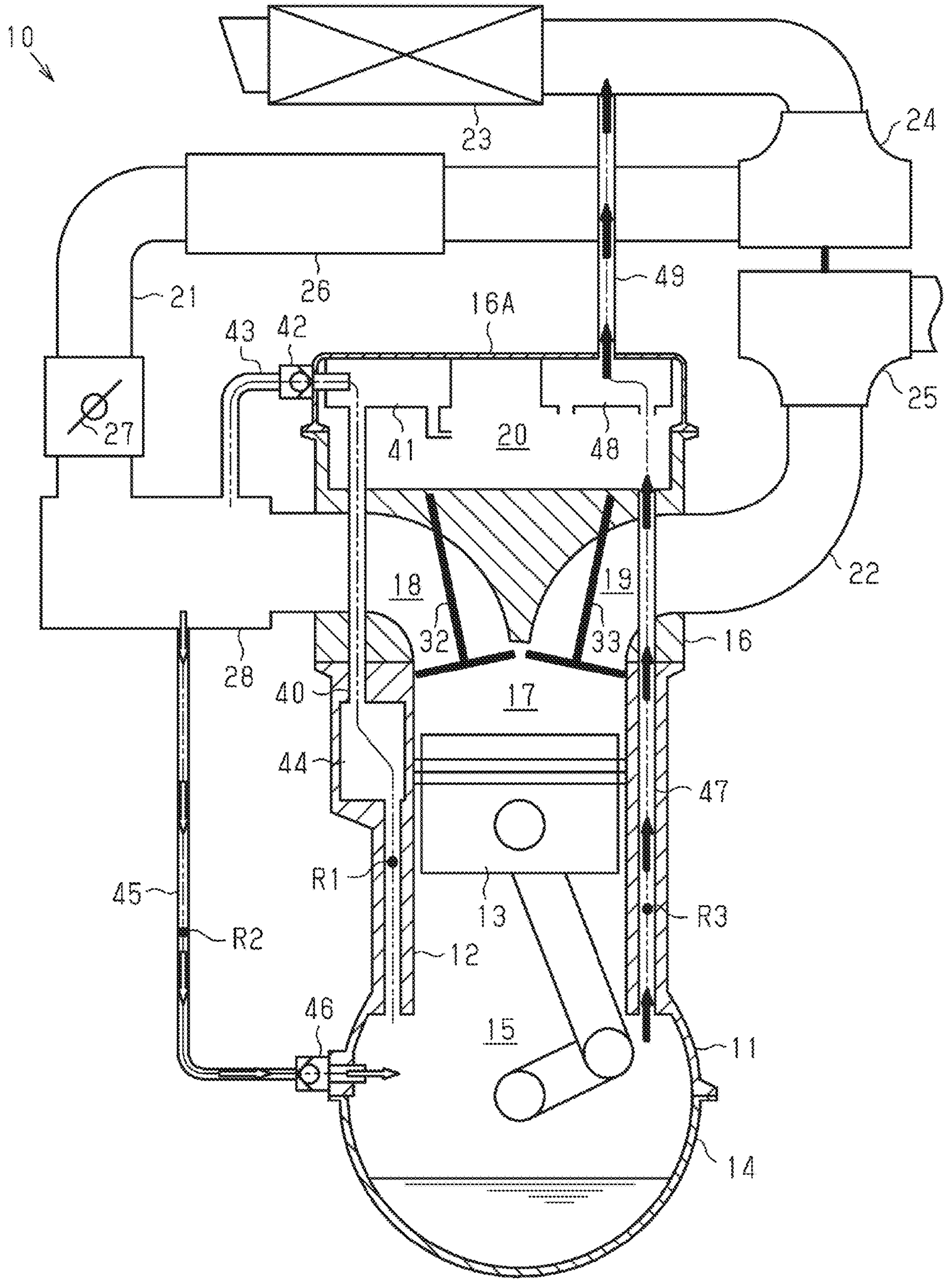
FIG. 3 is a view showing a flow of gas during a supercharging operation in the blow-by gas recirculation device installed in the turbocharged engine.

FIG. 3 shows a state of the blow-by gas recirculation device during the supercharging operation. During the supercharging operation, a portion of the intake passage 21 on the downstream side of the compressor 24 becomes a positive pressure. The second passage R2 is provided so as to communicate the crankcase 15 with the intake manifold 28, which is a positive pressure part in the intake passage 21. The second check valve 46 installed in the second passage R2 is configured to allow the flow of gases from the intake passage 21 through the second passage R2 to the inside of the crankcase 15. Therefore, air is introduced into the crankcase 15 through the second passage R2 at this time. Then, the blow-by gas in the crankcase 15 is delivered to the intake passage 21 through the third passage R3 by the introduced positive pressure air.

Figure 4:
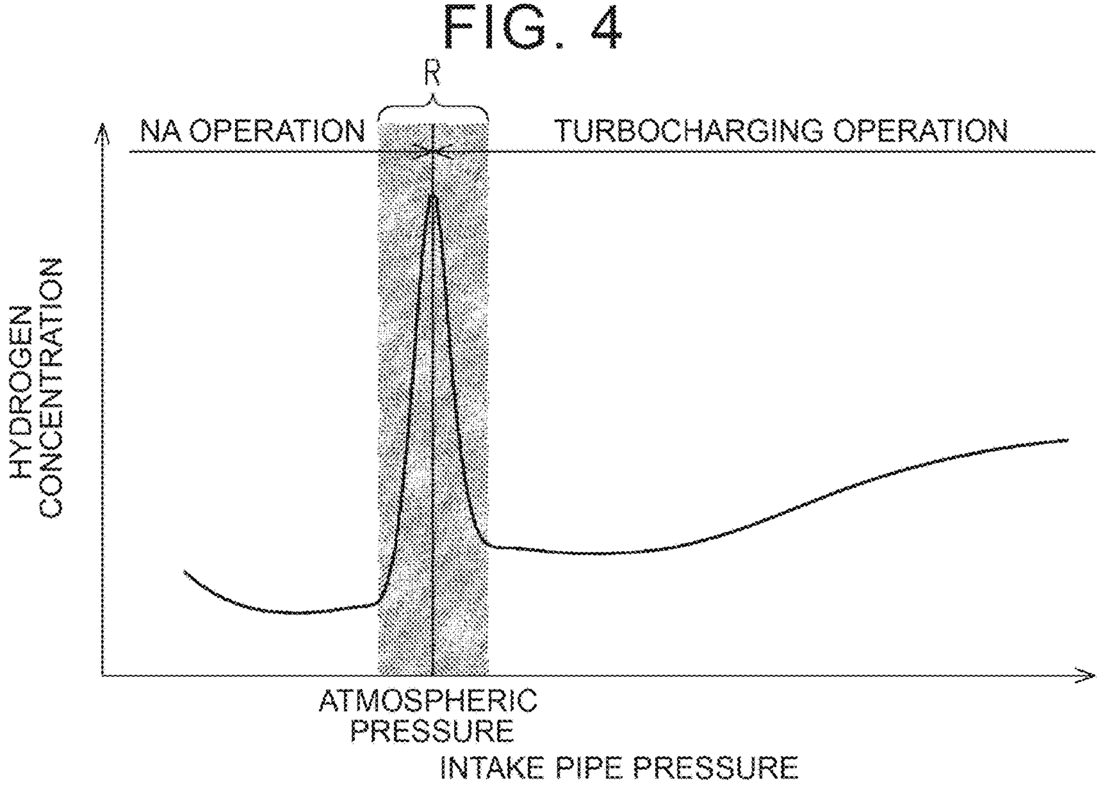
FIG. 4 is a graph showing the relationship between the hydrogen concentration in the crankcase and the intake pipe pressure in the turbocharged engine.

FIG. 4 shows the relation between the hydrogen concentration in the crankcase 15 and the intake pipe pressure PM. FIG. 4 shows the hydrogen concentration in the crankcase 15 measured under various intake pipe pressure PM after the turbocharged engine 10 is operated for a predetermined period while the intake pipe pressure PM and the engine speed NE are kept constant. When the intake pipe pressure PM is lower than the atmospheric pressure, the crankcase 15 is ventilated in the embodiment of FIG. 2. If it is higher than the intake pipe pressure PM, the crankcase 15 is ventilated in the embodiment of FIG. 3. However, when the intake pipe pressure PM is in the vicinity of the atmospheric pressure, adequate ventilation cannot be performed by any of the embodiments of FIGS. 2 and 3. Therefore, when the intake pipe pressure PM continues in the vicinity of the atmospheric pressure, the hydrogen-concentration in the crankcase 15 increases due to insufficient ventilation. In FIG. 4, the area R of the intake pipe pressure PM where the ventilation is insufficient is indicated by dots. In the following explanation, a state in which the ventilation capacity of the crankcase 15 is reduced because the intake pipe pressure PM is near the atmospheric pressure is referred to as a ventilation stagnant state.

Configuration of Vehicle Control Device

The control device of the vehicle of the present embodiment is applied to a vehicle equipped with the turbocharged engine 10 including the blow-by gas recirculation device as described above. The control device of the vehicle avoids a situation in which the intake pipe pressure PM continues to be in the vicinity of the atmospheric pressure and the crankcase 15 is insufficiently ventilated by executing the stagnation elimination control described later.

Figure 5:
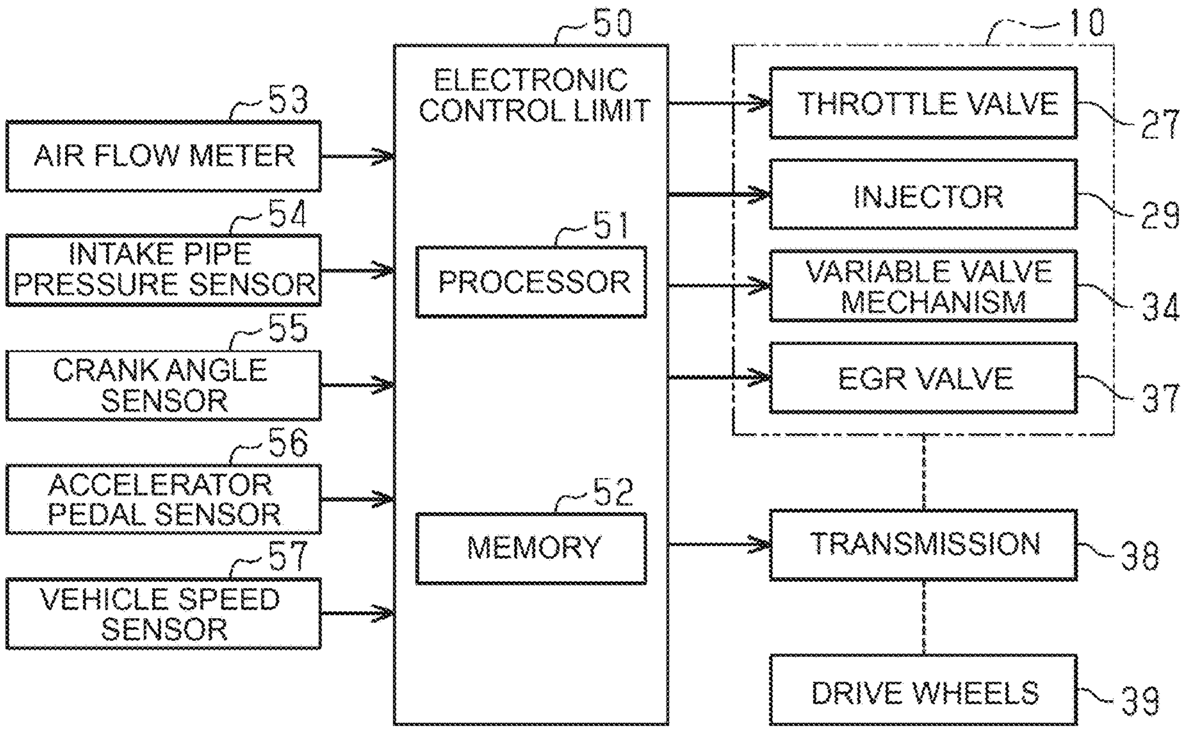
FIG. 5 is a diagram schematically showing a configuration of a control device of the above-mentioned vehicle.

Next, a configuration of a control device for a vehicle according to the present embodiment will be described with reference to FIG. 5. The control device comprises an electronic control unit 50. The electronic control unit 50 includes a processor 51 and a memory 52. The memory 52 stores various programs and data for vehicle control. The processor 51 is a processing circuit that reads and executes a program from the memory 52.

The electronic control unit 50 receives detection signals of various sensors installed in the respective units of the vehicle. Such sensors include an air flow meter 53, an intake pipe pressure sensor 54, a crank angle sensor 55, an accelerator pedal sensor 56, and a vehicle speed sensor 57. The air flow meter 53 is a sensor that detects a flow rate of intake air flowing through the intake passage 21 of the turbocharged engine 10 (hereinafter, referred to as an intake air amount GA). The intake pipe pressure sensor 54 is a sensor that detects an intake pipe pressure PM of the turbocharged engine 10. The crank angle sensor 55 is a sensor that detects a crank angle of the turbocharged engine 10. The crank angle represents the rotational phase of the crankshaft, which is the output shaft of the turbocharged engine 10. The accelerator pedal sensor 56 is a sensor that detects a depression amount of an accelerator pedal (hereinafter referred to as an accelerator depression amount ACC) by a driver of the vehicle. The vehicle speed sensor 57 is a sensor that detects a traveling speed (hereinafter, referred to as a vehicle speed V) of the vehicle.

The electronic control unit 50 controls the throttle valve 27, the injector 29, the variable valve mechanism 34, EGR valve 37, and the like of the turbocharged engine 10 based on the detection results of these sensors. Specifically, the electronic control unit 50 calculates the operating amounts of the throttle valve 27, the injector 29, the variable valve mechanism 34, EGR valve 37, and the like, based on the detected values of the respective sensors. The electronic control unit 50 drives the throttle valve 27, the injector 29, the variable valve mechanism 34, EGR valve 37, and the like based on the calculated manipulated variables. Thus, the electronic control unit 50 controls the operating state of the turbocharged engine 10 by adjusting the air-fuel ratio of the air-fuel mixture burned in the combustion chamber 17, the recirculation amount of the exhaust gas, the valve timing of the intake valve 32, and the like. Further, the electronic control unit 50 controls the transmission of the vehicle by adjusting the gear ratio of the transmission 38 provided in the power transmission path from the turbocharged engine 10 to the drive wheels 39 based on the detection results of the respective sensors.

Stagnation Relief Control

Further, the electronic control unit 50 performs stagnation elimination control for eliminating the above-described ventilation stagnation state as part of the control of the vehicle. In the following description, the control of the turbocharged engine 10, the transmission 38, and the like performed by the electronic control unit 50 when the stagnation elimination control is not executed will be described as the normal vehicle control.

Figure 6:
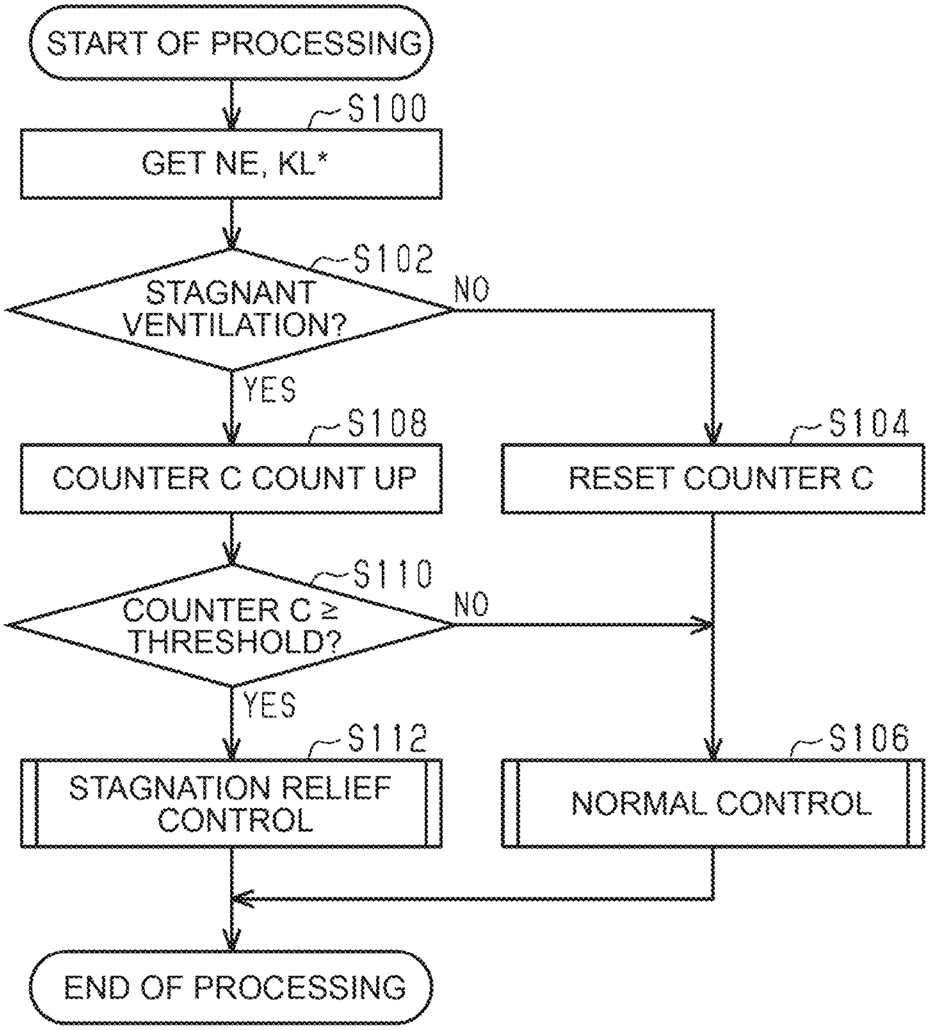
FIG. 6 is a flowchart of a stagnation elimination control routine executed by the control device of the vehicle.

FIG. 6 shows a processing procedure of the electronic control unit 50 for determining whether to execute the stagnation elimination control or the normal vehicle control. During operation of the turbocharged engine 10, the electronic control unit 50 repeatedly executes the processing of FIG. 6 at predetermined control cycles. Note that "S" in the following description and FIG. 5 represents a step of processing executed by the electronic control unit 50.

When the process of FIG. 6 is started, the electronic control unit 50 first acquires the engine speed NE and the required load factor KL* in S100. The engine speed NE is the rotational speed of the crankshaft, which is the output shaft of the turbocharged engine 10. The electronic control unit 50 obtains the engine speed NE based on the sensor signal of the crank angle sensor 55. The required load factor KL* is a required value of the intake air filling factor n of the combustion chamber 17. The electronic control unit 50 obtains the required load factor KL*, based on the detection signal of the accelerator pedal sensor 56, the calculation value of the engine speed NE, and the like. The electronic control unit 50 performs normal control when the stagnation elimination control is not executed. In the normal control, the operating amounts of the throttle valve 27, the variable valve mechanism 34, EGR valve 37, and the like are determined so that the intake air filling rate η of the combustion chamber 17 is equal to the required loading rate KL*.

In a subsequent S102, the electronic control unit 50 determines whether the turbocharged engine 10 is in a stagnant condition. The electronic control unit 50 estimates the intake pipe pressure PM when the turbocharged engine 10 is operated with the intake charge rate n of the combustion chamber 17 equal to the required load rate KL*, by performing normal vehicle control at the time of determination in S102. Then, the electronic control unit 50 determines that the turbocharged engine 10 is in a stagnant state when the estimated intake pipe pressure PM is within a predetermined range including the atmospheric pressure.

When the turbocharged engine 10 is not in a S102: NO condition, the electronic control unit 50 resets the counter C to "0" in S104. Then, the electronic control unit 50 performs normal vehicular control (S106).

On the other hand, when the turbocharged engine 10 is in S102: YES, the electronic control unit 50 counts up the counter C in S108. The electronic control unit 50 then determines, in a S110, whether the value of the counter C is greater than or equal to a predetermined threshold. When it is determined that the value of the counter C is less than the threshold value (S110: NO), the electronic control unit 50 performs normal vehicle control (S106). On the other hand, when it is determined that the value of the counter C is equal to or larger than the threshold value (S110: YES), the electronic control unit 50 performs the stagnation elimination control instead of the normal vehicle control (S112).

The stagnation elimination control is a control for changing the operating condition of the turbocharged engine 10 to an operating condition in which the ventilation stagnation state is eliminated while maintaining the driving force of the vehicle at the same magnitude as in the case where the normal vehicle control is performed. The stagnation elimination control is performed, for example, by performing any one of the following processes (A) to (D), or a combination of two or more of these processes.

The processes (A) to (D) may be performed so as to eliminate the ventilation stagnation state by increasing the intake pipe pressure PM, or may be performed so as to eliminate the ventilation stagnation state by decreasing the intake pipe pressure PM. Which one is adopted may be determined in consideration of a contradiction caused by the execution of the stagnation elimination control such as a decrease in fuel efficiency and exhaust performance of the turbocharged engine 10, for example.

The process (A) is a process of adjusting the air-fuel ratio of the air-fuel mixture to be combusted in the turbocharged engine 10. When the vehicle is traveling steadily in a state where the gear ratio of the vehicle speed V and the transmission 38 is constant, the driving force of the vehicle can be maintained by keeping the output of the turbocharged engine 10 constant. When the air-fuel ratio changes, the thermal efficiency of the turbocharged engine 10 changes. Therefore, in order to change the air-fuel ratio while maintaining the output of the turbocharged engine 10, it is necessary to change the intake air filling rate n. Then, the intake pipe pressure PM is changed by changing the intake air filling rate n. Therefore, by adjusting the air-fuel ratio to a value different from that in the case of the normal vehicle control while maintaining the output of the turbocharged engine 10, the ventilation stagnation state can be eliminated. The air-fuel ratio can be adjusted by, for example, adjusting the opening degree of the throttle valve 27.

Process (B) is a process for adjusting the recirculation amount of the exhaust gas into the intake air by the exhaust gas recirculation device. The exhaust gas recirculation device introduces the exhaust gas into a portion of the intake passage 21 on the downstream side of the throttle valve 27. Introduction of exhausts into these parts increases the intake pipe pressure PM. Therefore, by changing the recirculation amount of the exhaust gas while maintaining the amount of air introduced into the combustion chamber 17, the intake pipe pressure PM can be changed while maintaining the output of the turbocharged engine 10. The recirculation rate of the exhausted air can be adjusted by changing the opening degree of the throttle valve 27 and EGR valve 37.

The process (C) is a process of adjusting the valve timing of the intake valve 32. When the valve timing of the intake valve 32 changes, the intake efficiency of the combustion chamber 17 changes. Therefore, the intake pipe pressure PM at which the intake filling rate n of the combustion chamber 17 has a constant value, that is, the intake pipe pressure PM at which the power of the turbocharged engine 10 has a constant value varies depending on the valve timing of the intake valve 32. Therefore, by adjusting the valve timing of the intake valve 32, the intake pipe pressure PM can be changed while the power of the turbocharged engine 10 is maintained.

The process (D) is a process of adjusting the gear ratio of the transmission 38. When the gear ratio of the transmission 38 is changed, the operating point of the turbocharged engine 10 capable of maintaining the driving force of the vehicle is changed. Then, the intake pipe pressure PM of the turbocharged engine 10 changes due to a change in the operating point. Therefore, by adjusting the gear ratio of the transmission 38, the intake pipe pressure PM can be changed while the power of the turbocharged engine 10 is maintained.

Operation and Effect of Embodiments

Operations and effects of the embodiment will be described. In the process of FIG. 6, the electronic control unit 50 determines whether or not the turbocharged engine 10 is in a ventilatory stagnation state when the normal vehicle control is performed (S102). The ventilatory stagnation state is a state in which the intake pipe pressure PM of the turbocharged engine 10 is in the vicinity of the atmospheric pressure.

The electronic control unit 50 counts up (S104) when it is determined that the value of the counter C is in the ventilation stagnant state (S102: YES), and resets (S108) when it is determined that the value is not in the ventilation stagnant state (S102: NO). The value of the counter C operated in this way represents the time during which the ventilation stagnation state continues. Then, when the value of the counter C is equal to or larger than the predetermined threshold value (S110: YES), the electronic control unit 50 executes the stagnation elimination control instead of the normal vehicle control (S112). After starting the stagnation elimination control, the electronic control unit 50 returns to the normal vehicle control (S106) when it is determined that the normal vehicle control does not cause the ventilating stagnation (S102: NO).

The blow-by gas recirculation device configured as described above can ventilate the crankcase 15 both during NA operation of the turbocharged engine 10 and during the supercharging operation, but the ventilation capacity decreases when the intake pipe pressure PM is in the vicinity of the atmospheric pressure. If such a ventilation stagnant state continues, the ventilation of the crankcase 15 becomes insufficient.

When the ventilation stagnation state continues for a predetermined time or longer, the electronic control unit 50 executes the stagnation elimination control instead of the normal vehicle control. When the stagnation elimination control is executed, the operating conditions of the turbocharged engine 10 are changed so that the ventilation stagnation state is eliminated while the driving force of the vehicle is maintained. After that, the electronic control unit 50 continues the stagnation elimination control until the state becomes a state where the ventilation stagnation state is not reached even after returning to the normal vehicle control.

According to the control measures of the vehicle of the present embodiment described above, the following effects can be obtained. The turbocharged engine 10 mounted on the vehicle to which the control device of the present embodiment is controlled is provided with a blow-by gas recirculation device capable of ventilating the crankcase 15 both during NA operation and during the supercharging operation. However, when the intake pipe pressure PM is in the vicinity of the atmospheric pressure, the turbocharged engine 10 is in a ventilation stagnation condition in which adequate ventilation cannot be performed. The electronic control unit 50 executes the stagnation elimination control when the ventilation stagnation state continues. The stagnation elimination control is a control for changing the operating condition of the turbocharged engine 10 to an operating condition in which the driving force of the vehicle is maintained and the ventilation stagnation state is eliminated. When the stagnation elimination control is started, the ventilation stagnation state of the turbocharged engine 10 is eliminated. Therefore, in the vehicle control device of the present embodiment, the control device of the vehicle has an effect of suppressing a ventilation failure of the crankcase 15 of the turbocharged engine 10. The operation conditions of the turbocharged engine 10 in the stagnation elimination control can be changed through, for example, adjustment of the air-fuel ratio, adjustment of the recirculation amount of the exhaust gas, adjustment of the valve timing of the intake valve 32, adjustment of the gear ratio of the transmission 38, and the like.

The blow-by gas recirculation device included in the turbocharged engine 10 includes a first passage R1, a second passage R2, a third passage R3, a first check valve 42, and a second check valve 46. The first passage R1 is a passage that communicates a part of the intake passage 21 downstream of the throttle valve 27 with the crankcase 15. The second passage R2 is a passage that communicates the crankcase 15 with a part of the intake passage 21 downstream of the intercooler 26. The third passage R3 is a passage that communicates a part of the intake passage 21 upstream of the compressor 24 with the crankcase 15. The first check valve 42 is a valve that allows the flow of gas from the crankcase 15 to the intake passage 21 through the first passage R1, while restricting the flow of gas from the intake passage 21 to the inside of the crankcase 15 through the first passage R1. The second check valve 46 is a valve that allows the flow of gas from the intake passage 21 to the crankcase 15 through the second passage R2, while restricting the flow of gas from the crankcase 15 to the intake passage 21 through the second passage R2. The blow-by gas recirculation device can ventilate the blow-by gas in the crankcase 15 during both the natural intake operation and the supercharging operation of the turbocharged engine 10.

OTHER EMBODIMENTS

The present embodiment can be modified and implemented as follows. The present embodiment and modification examples described below may be carried out in combination of each other within a technically consistent range.

As long as the operation conditions of the turbocharged engine 10 can be changed so as to escape the ventilation stagnation state while maintaining the driving force of the vehicle, the stagnation elimination control may be performed by a process other than the processes (A) to (D) described above. For example, it is also possible to perform stagnation elimination control through adjustment of the ignition timing of the turbocharged engine 10. Further, in hybrid electric vehicle where a motor is provided as a drive source in addition to the turbocharged engine 10, the stagnation elimination control can be performed by adjusting the power distribution rate between the turbocharged engine 10 and the motor.

In the above-described embodiment, after the start of the stagnation elimination control, the electronic control unit 50 terminates the stagnation elimination control when the turbocharged engine 10 is not in the ventilation stagnation state even when the normal vehicle control is performed. The conditions for ending the stagnation elimination control may be changed as appropriate. For example, after the start of the stagnation elimination control, the stagnation elimination control may be terminated at a time point when a predetermined time has elapsed. Further, the stagnation elimination control may be terminated when the integrated intake air amount, the integrated fuel injection amount, and the travel distance of the vehicle of the turbocharged engine 10 after the start of the stagnation elimination control become equal to or larger than a predetermined threshold value.

In S102 of FIG. 6, it is determined whether or not the turbocharged engine 10 is in a stagnant state when the normal vehicle control is performed based on the engine speed NE and the required load factor KL*. In S102, it may be determined whether or not the turbocharged engine 10 is currently in a ventilatory stagnation condition. Such determination can be made based on the detection result of the intake pipe pressure sensor 54. In addition, the same determination can be made by using an estimated value of the intake pipe pressure PM based on the detection result of another sensor.

The configuration of the blow-by gas recirculation device may be changed as appropriate. For example, the intake side of the second passage R2 may be connected to a portion other than the intake manifold 28 as long as the portion of the intake passage 21 downstream of the compressor 24. Further, a part or all of the first PCV hose 43, the second PCV hose 45, and the third PCV hose 49 may be replaced with a metallic pipe.

The turbocharged engine 10 may be a turbocharged engine other than a hydrogen engine such as a gasoline engine or a diesel engine. In the case of an engine including a plurality of banks such as a V-type engine and a compressor, the blow-by gas recirculation device of the above-described embodiment may be provided separately for each bag.

What is claimed is:

1. A control system for a vehicle, the control system including:
  a processor;
  a memory; and
  a turbocharged engine including
    a compressor installed in an intake passage,
    a throttle valve installed in a portion of the intake passage downstream of the compressor, and
    a blow-by gas recirculation device configured to recirculate blow-by gas from a crankcase into the intake passage, wherein:
  the blow-by gas recirculation device includes
    a first passage that communicates a portion of the intake passage downstream of the throttle valve with the crankcase, the first passage including a first check valve that allows gas to flow from the crankcase to the intake passage and restricts the gas to flow from the intake passage to the crankcase,
    a second passage that communicates a portion of the intake passage downstream of the throttle valve with the crankcase, the second passage including a second check valve that allows gas to flow from the intake passage to the crankcase and restricts the gas to flow from the crankcase to the intake passage, and
    a third passage that communicates a portion of the intake passage upstream of the compressor with the crankcase;
  the processor is configured to, in a case where a ventilation stagnation state of the turbocharged engine continues, execute stagnation termination control to change an operation condition of the turbocharged engine to maintain a driving force of the vehicle and terminate the ventilation stagnation state; and
  the ventilation stagnation state is a state in which an intake pipe pressure of the turbocharged engine is about equal to an atmospheric pressure.

2. The control system according to claim 1, wherein a change of the operation condition in the stagnation termination control is performed by adjusting an air-fuel ratio of an air-fuel mixture to be combusted in the turbocharged engine.

3. The control system according to claim 1, wherein the turbocharged engine includes an exhaust gas recirculation device configured to recirculate part of exhaust gas into the intake air, and a change of the operation condition in the stagnation termination control is performed by adjusting an amount of the exhaust gas recirculated by the exhaust gas recirculation device.

4. The control system according to claim 1, wherein the turbocharged engine includes a variable valve mechanism configured to change a valve timing of an intake valve, and a change of the operation condition in the stagnation termination control is performed by adjusting the valve timing.

5. The control system according to claim 1, wherein a change of the operation condition in the stagnation termination control is performed by adjusting a gear ratio of a transmission of the vehicle.

6. The control system according to claim 1, wherein the second check valve is present at an outer side, midsection of the crankcase.

* * * * *